INVENTORS
WINSOR SHIPPEE &
CARL C. SHIPPEE
BY
Frederic P. Warfield
ATTORNEY

Patented June 18, 1940

2,204,829

UNITED STATES PATENT OFFICE 2,204,829

FASTENING DEVICE

Winsor Shippee and Carl C. Shippee, Red Bank, N. J.

Application May 28, 1938, Serial No. 210,553

8 Claims. (Cl. 85—1)

This invention relates to fastening devices for detachably securing together separate parts such as for example, parts of aircraft, securing automobile license plates to their brackets and many other similar purposes.

More specifically, this invention relates to improvements on the fastening devices shown and described in our prior Patent, No. 2,120,530, June 14, 1938.

Our said patent shows a type of fastening device comprising a spring pressure plate secured to one of the parts to be fastened together, and a bolt adapted to pass through said parts and interlock with said plate.

One of the principal objects of this invention is to provide an improved type of bolt which will result in a more secure and at the same time a simpler connection.

A further object is to provide an improved pressure plate for the above type of fasteners.

Other objects will in part be obvious and will in part be pointed out in the following description of one embodiment of the invention, which is given as a non-limiting example in connection with the accompanying drawing, in which.

Figure 1:
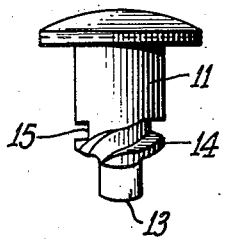
Figure 1 is a side elevation of a bolt constructed in accordance with the invention.
Figure 2:
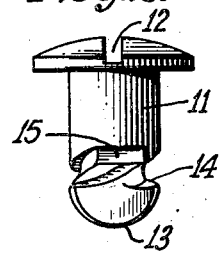
Figure 2 is a view similar to Fig. 1 but at right angles thereto.

The drawing shows the device of the invention securing together two parts A and B, which may be metal plates or the like. Parts A and B are provided with coinciding holes in which is inserted bolt 11 provided in the head with a slot 12 for a screw driver. At its end, bolt 11 is cut to form a stud 13 of oblong or other similar shape adapted to facilitate entry of bolt 11 into slot 17 as explained hereinafter. Between stud 13 and shank portion 11, there are provided threads 14 culminating in slots 15 which are perpendicular to the axis of the bolt. Thus the threads may be described as eccentric, and by the use of that term in the claims, this construction is meant. If desired, shank 11 may be provided with an annular groove for holding a lock washer.

Figure 3:
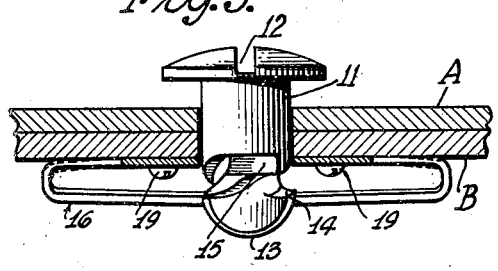
Figure 3 is a view in longitudinal section showing the device of the invention in operation but unlocked.
Figure 5:
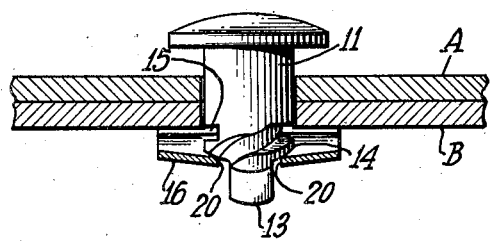
Figure 5 is a cross section taken at right angles to Fig. 3.
Figure 6:
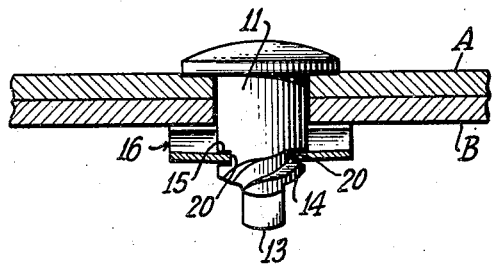
Figure 6 is a cross section taken at right angles to Fig. 4.
Figure 7:
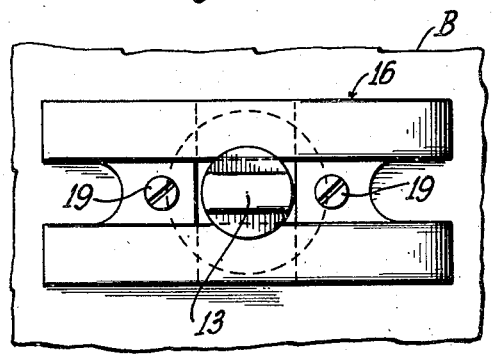
Figure 7 is a bottom view of the device of the invention, showing the same in operative position.
Figure 8:
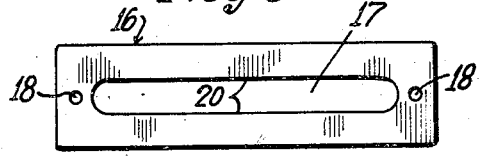
Figure 8 shows the blank used as a spring plate in the invention.

The cooperating member of the fastener assembly comprises mainly spring plate 16 which is preferably stamped from a single sheet of resilient metal with oblong slot 17 and screw holes 18, as shown in Fig. 8. Blank 16 is bent as shown in Fig. 3 and secured to part B by means of screws or rivets 19 in holes 18. Preferably edges 20 of slot 17 should be made to slope slightly and take the form shown in Fig. 5, the slope being in the direction away from part B.

Figure 4:
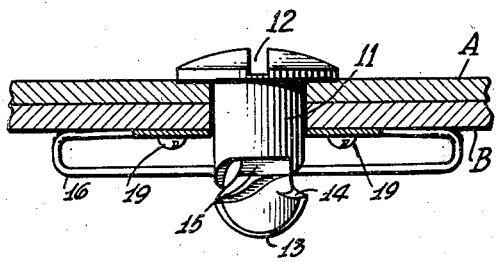
Figure 4 is a view similar to Fig. 3 showing the parts locked.

In operation, parts A and B are placed together with their central apertures coinciding, spring plate 16 having been already secured to part B, and bolt 11 is inserted in said apertures as shown in Fig. 3. Bolt 11 is then tightened by means of a screw driver, threads 14 engaging the sides of slot 17. Preferably threads 14 will be of such length that a one-half turn of bolt 11 will complete the screwing motion and bring the sides of slot 17 into engagement with slots 15, thus locking the parts together. The result of this turning operation will be twofold. Slot 17 will be expanded, distorting plate 16. At the same time sides 20 of slot 17 will be drawn in (upwards in Fig. 4), which will cause them to exert force tending to draw bolt 11 out (downwards in Fig. 4), thus further drawing the parts together. This result will be facilitated by the above mentioned outward slope of sides 20 of slot 17. Moreover, preferably bolt 11 and threads 14 will be somewhat tapered, which will increase the distortion of plate 16 by spreading slot 17 and thus further increase the locking tendency.

It will be seen that the device of the invention provides a simple fastening device for the described purpose which is at the same time positive in action and yet easily released. It will be seen also that the elements combining to form the complete device are individually simple and easy to manufacture in quantity, which is another advantage of the invention.

Since certain changes in carrying out the above operation, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described our invention, what we claim as new and desire to secure by Letters Patent, is:

1. A fastening device comprising, in combination, a spring plate member having an opening therethrough, and a bolt member provided with eccentric threads adapted to engage in said opening and expand said plate member and thereby to have interlocking relation therewith.

2. A fastening device comprising, in combination, a spring plate having a slotted opening therethrough, and a bolt member provided along its shank with helical threads terminating in parallel slots perpendicular to the axis of said bolt, said bolt being adapted to engage in said opening and expand said plate member, and said slots being adapted to receive the sides of said opening and thereby to cause interlocking relation between said members.

3. A fastening device comprising, in combination, a spring plate member having a slotted opening therethrough, and a bolt member provided at its end with a stud portion and provided along its shank with eccentric threads, said bolt being adapted to engage in said opening and expand said plate member and said threads being adapted to have interlocking relation with the sides of said opening.

4. A fastening device comprising, in combination, a spring plate member having a slotted opening therethrough, and a bolt member provided at its end with a stud portion and provided along its shank with helical threads terminating in parallel slots perpendicular to the axis of said bolt, said bolt being adapted to engage in said opening and expand the same, and said slots being adapted to receive the sides of said opening and thereby to cause interlocking relation between said members.

5. In a fastening device, the combination with parts to be fastened together, of a pair of co-engaging fastening elements comprising a spring plate member having an opening therethrough mounted on one of the parts, and a bolt member projecting through said parts and said opening, said bolt member being provided with eccentric threads adapted to engage in said opening and expand said plate member and thereby to have interlocking relation therewith.

6. In a fastening device, the combination with parts to be fastened together of a pair of co-engaging fastening elements comprising a spring plate member having an opening therethrough mounted on one of the parts, and a bolt member projecting through said parts and said opening, said bolt member being provided along its shank with helical threads terminating in parallel slots perpendicular to the axis of said bolt, said bolt being adapted to engage in said opening and expand said plate member, and said slots being adapted to receive the sides of said opening and thereby to cause interlocking relation between the members and so fasten said parts together.

7. In a fastening device, the combination with parts to be fastened together of a pair of co-engaging fastening elements comprising a spring plate member having an opening therethrough mounted on one of the parts, and a bolt member projecting through said parts and said opening, said bolt member being provided at its end with an oblong stud and provided along its shank with eccentric threads, said bolt being adapted to engage in said opening and expand said plate member and said threads being adapted to have interlocking relation with the sides of said opening.

8. In a fastening device, the combination with parts to be fastened together of a pair of co-engaging fastening elements comprising a spring plate member having an opening therethrough mounted on one of the parts, and a bolt member projecting through said parts and said opening, said bolt member being provided at its end with an oblong stud and provided along its shank with helical threads terminating in parallel slots perpendicular to the axis of said bolt, said bolt being adapted to engage in said opening and expand said plate member, and said slots being adapted to receive the sides of said opening and thereby to cause interlocking relation between the members and so fasten said parts together.

WINSOR SHIPPEE.
CARL C. SHIPPEE.